United States Patent
Polley et al.

(10) Patent No.: US 11,048,548 B1
(45) Date of Patent: Jun. 29, 2021

(54) PRODUCT LINE AVIONICS SYSTEM MULTI-CORE ANALYSIS ARCHITECTURE

(71) Applicant: Rockwell Collins, Inc., Cedar Rapids, IA (US)

(72) Inventors: Jonathan W. Polley, Marion, IA (US); David J. Radack, Robins, IA (US); John L. Hagen, Marion, IA (US); Ramon C. Redondo, Marion, IA (US); Carl J. Henning, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 178 days.

(21) Appl. No.: 16/284,839

(22) Filed: Feb. 25, 2019

(51) Int. Cl.
| | |
|---|---|
| G06F 9/46 | (2006.01) |
| G06F 9/455 | (2018.01) |
| G06F 9/30 | (2018.01) |
| G06F 9/54 | (2006.01) |
| G06F 11/34 | (2006.01) |
| G06F 13/16 | (2006.01) |
| G06F 9/52 | (2006.01) |

(52) U.S. Cl.
CPC .......... *G06F 9/468* (2013.01); *G06F 9/30101* (2013.01); *G06F 9/455* (2013.01); *G06F 9/45533* (2013.01); *G06F 9/45554* (2013.01); *G06F 9/45558* (2013.01); *G06F 9/546* (2013.01); *G06F 11/3409* (2013.01); *G06F 11/3466* (2013.01); *G06F 13/1663* (2013.01); *G06F 9/52* (2013.01); *G06F 9/544* (2013.01); *G06F 2009/45591* (2013.01)

(58) Field of Classification Search
None
See application file for complete search history.

(56) References Cited

U.S. PATENT DOCUMENTS

2019/0294472 A1* 9/2019 Varadarajan .......... G06F 9/4881

OTHER PUBLICATIONS

Wang et al., "VMon: Monitoring and Quantifying Virtual Machine Interference via Hardware Performance Counter", 2015, IEEE, pp. 399-408. (Year: 2015).*
Govindan et al., "Cuanta: Quantifying Effects of Shared On-chip Resource Interference for Consolidated Virtual Machines", Oct. 2011, SOCC'11. (Year: 2011).*

* cited by examiner

Primary Examiner — Qing Yuan Wu
(74) Attorney, Agent, or Firm — Suiter Swantz pc llo

(57) ABSTRACT

A multi-core processing environment (MCPE) capable of quantifying shared system resource (SSR) access includes several processing cores, each core having several applications running thereon and accessing SSRs via virtual machines (VM). Each core includes core-specific shared memory and a guest operating system (GOS) for writing timestamped VM data entries to a core-specific data queue, each entry identifying an activated VM and its activation time. Hypervisor-accessible memory stores performance monitor registers (PMR) for monitoring specific MCPE features as well as PMR data queues for each core, the PMR data including timestamped values of the monitored features. The hypervisor writes the VM/PMR data to the corresponding queues and frequently samples PMR data. A correlation module correlates the queued VM/PMR data to determine execution times of each activated VM and (for each execution time) counts of PMR changes, each PMR change corresponding to an SSR access by a core of the MCPE.

20 Claims, 6 Drawing Sheets

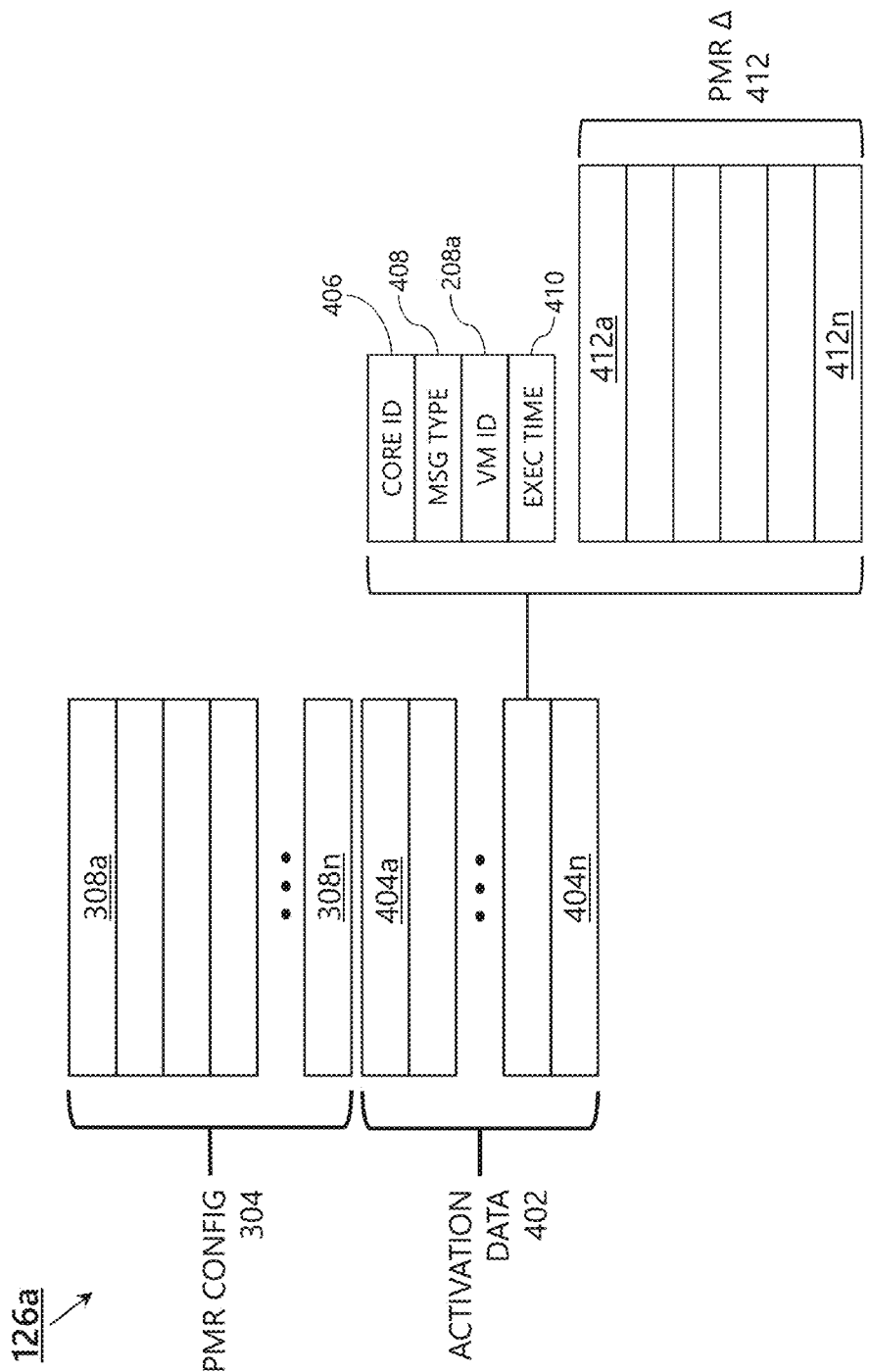

520 — Forwarding at least one of the determined VM execution time and the determined count of PMR changes to a capture module located remotely from the MCPE

FIG. 5B

PRODUCT LINE AVIONICS SYSTEM MULTI-CORE ANALYSIS ARCHITECTURE

BACKGROUND

A multicore processor (or multicore processing environment (MCPE)) provides two or more processing cores (processing units) capable of executing multiple tasks or processes at once. Certification of such safety-critical multicore-based avionics processing systems is an important goal for the aviation industry (although multicore processing systems may similarly be implemented across water-based or ground-based mobile platforms). If multiple cores, or multiple applications configured to execute concurrently on said cores, compete for the same shared system resources (SSR), a particular core or application may access or use a particular SSR to an excessive degree, which may in turn interfere with and degrade the use of said shared resource by other applications or cores within the MCPE, creating latency issues for said other applications.

It is possible, during the certification process, to predict growth in the worst case execution time (WCET) for multiple applications due to competition for SSR. However, these predictions may be inexact and must therefore err on the side of safety. As a result, WCET predictions may be more conservative than is truly necessary; accordingly, programs may be restricted from integrating as many applications within the MCPE as they are safely able to handle.

SUMMARY

In one aspect, embodiments of the inventive concepts disclosed herein are directed to a multi-core processing environment (MCPE). The MCPE includes a plurality of processing cores (e.g., threaded cores, logical execution units), each core having several applications configured to execute thereon. In order to fulfill their objectives, executing applications access shared system resources (SSR) via virtual machines (VM). Each core includes a core-specific shared memory region accessible to that core, and a guest operating system (GOS) for writing timestamped virtual machine (VM) data entries to a core-specific VM data queue, each VM data entry identifying an activated VM and the time of activation. The MCPE includes shared memory regions where the core-specific VM data queues are stored, as well as hypervisor-accessible memory regions wherein are stored performance monitor registers (PMR) for tracking or monitoring specific features or attributes of the MCPE. The hypervisor-accessible memory regions also store PMR states and PMR data queues for each core; the PMR data entries include timestamped values of the monitored features. The MCPE includes a hypervisor which writes the timestamped VM data and PMR data to the corresponding core-specific VM data queues and PMR data queues. At intervals, the hypervisor samples PMR data entries from each PMR data queue. A correlation module running on a core of the MCPE reads the queued VM data and the queued PMR data, correlating the data entries to determine execution times of each activated VM. For each execution time, the correlation module counts the corresponding PMR deltas (e.g., changes) as reflected by the corresponding PMR data entries, where each PMR change corresponds to an SSR access by a core of the MCPE (e.g., by an application running thereon).

In a further aspect, embodiments of the inventive concepts disclosed herein are directed to a multi-core processing environment (MCPE) including a group of processing cores (e.g., threaded cores, logical execution units) and shared system resources (SSR) accessed by the applications running on each core (e.g., via virtual machines (VM)). Each core includes a core-specific shared memory region accessible to that core, and a guest operating system (GOS) for writing timestamped virtual machine (VM) data entries to a core-specific VM data queue, each VM data entry identifying an activated VM and the time of activation. The MCPE includes shared memory regions where the core-specific VM data queues are stored, as well as hypervisor-accessible memory regions wherein are stored performance monitor registers (PMR) for tracking or monitoring specific features or attributes of the MCPE. The hypervisor-accessible memory regions also store PMR states, e.g., snapshots of the monitored features at a given time, and PMR data queues for each core; the PMR data include timestamped values of the monitored features. The MCPE includes a hypervisor which writes the timestamped VM data and PMR to the corresponding core-specific VM data queues and PMR data queues. At intervals, the hypervisor samples PMR data entries from each PMR data queue. A correlation module running on a core of the MCPE reads the queued VM data and the queued PMR data, correlating the data entries to determine execution times of each activated VM. For each execution time, the correlation module counts the corresponding PMR deltas (e.g., changes) as reflected by the corresponding PMR data entries, where each PMR change corresponds to an SSR access by a core of the MCPE (e.g., by an application running thereon).

In a still further aspect, embodiments of the inventive concepts disclosed herein are directed to a method for quantifying shared system resource usage in a multi-core processing environment (MCPE). The method includes initializing, via a hypervisor of the MCPE, performance monitor registers (PMR) in a shared memory region of the MCPE. The method includes initializing, via the hypervisor, a plurality of PMR data queues in the shared memory region, each queue corresponding to a processing core of the MCPE. The method includes generating timestamped PMR data entries by sampling, via the hypervisor, each PMR at an interval corresponding to a time window. The method includes queuing, via the hypervisor, each PMR data entry to the corresponding PMR data queue. The method includes responding to a virtual machine (VM) activation (corresponding to an SSR access by a core of the MCPE) by generating a timestamped VM data entry via a guest operating system (GOS) associated with the processing core, the VM data entry corresponding to the activation time and the accessing core. The method includes queuing the VM data entry to the corresponding VM data queue in the shared memory region via the GOS or the hypervisor. The method includes reading the PMR data entries and VM data entries via a correlation module running on a core of the MCPE. The method includes determining, via the correlation module, a VM execution time corresponding to each VM activation. The method includes determining, via the correlation module, a count of PMR changes corresponding to each VM execution time, each PMR change corresponding to an SSR access by the accessing core.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 4 is a diagrammatic illustration of correlated output of the processing application of FIG. 1; and FIGS. 5A and 5B illustrate an exemplary embodiment of a method for quantifying shared system resource use according to the inventive concepts disclosed herein.

DETAILED DESCRIPTION OF EXEMPLARY EMBODIMENTS

Figure 1:
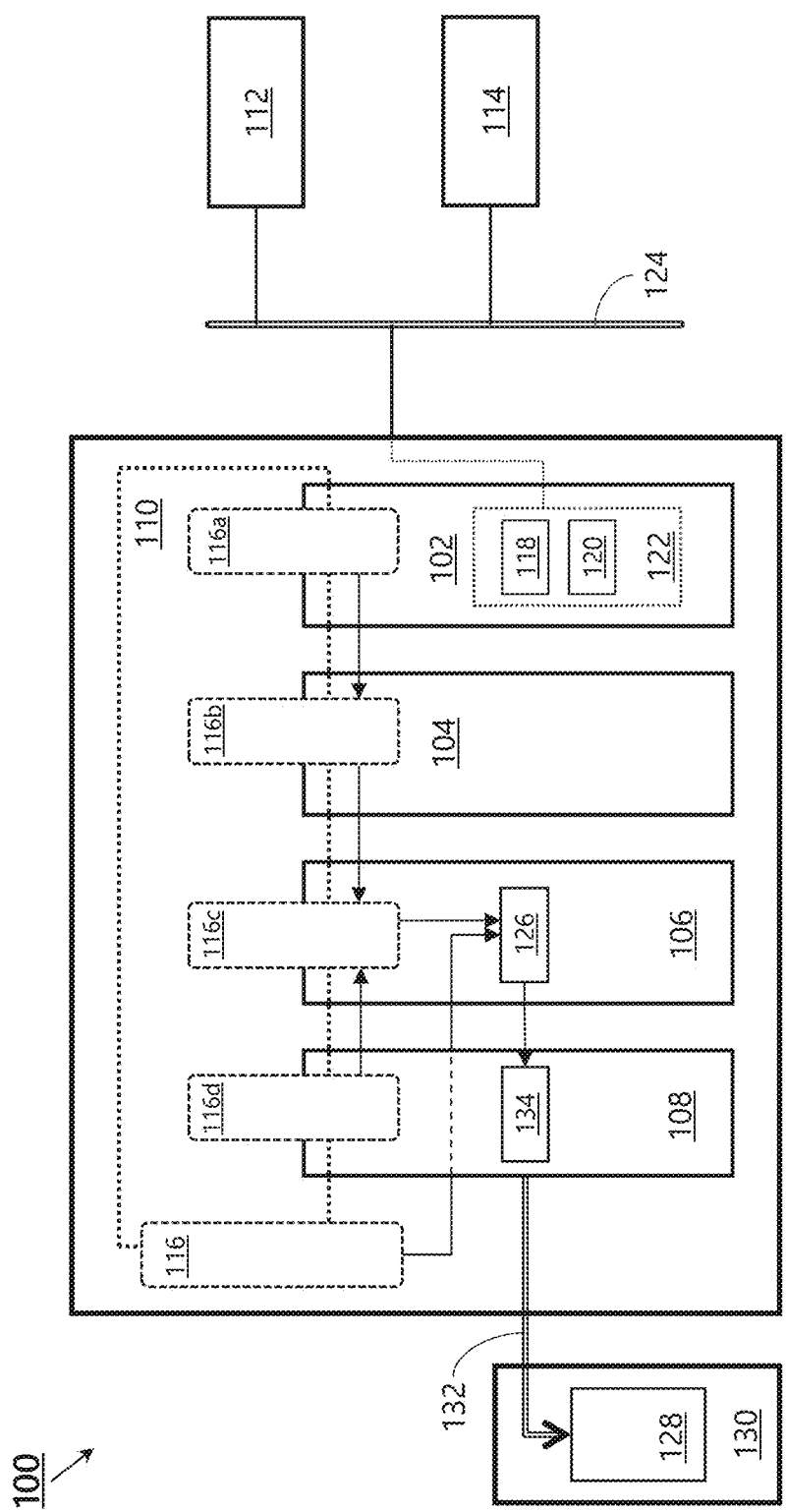
FIG. 1 is a diagrammatic illustration of an exemplary embodiment of a multi-core processing environment (MCPE) according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a Product Line Avionics System Multi-Core Analysis (PLASMA) architecture and related method for precise determination of shared system resource (SSR) access by the various avionics applications running on the cores of a multi-core processing environment (MCPE). For example, U.S. patent application Ser. No. 16/123,819, which is herein incorporated by reference in its entirety, discloses systems and methods for the rate limiting of applications and their hosting cores to access SSR to the exclusion of other applications and cores within the MCPE. By footprinting the exact amount of resources each application needs to meet its deadlines, rate limiting based on overly conservative and/or overly restrictive worst-case execution time (WCET) predictions may be avoided.

Referring to FIG. 1, an exemplary embodiment of a multi-core processing environment 100 (MCPE) according to the inventive concepts disclosed herein may include processing cores 102, 104, 106, 108; a hypervisor 110; shared system resources (SSR) 112, 114; and shared memory regions 116. The MCPE 100 may include any number of processing cores, including physical cores and/or virtual cores (e.g., a physical core dual- or multi-threaded to operate as multiple logical execution units). Each processing core 102-108 may incorporate one or more guest operating systems 118 (GOS) and user applications 120 (e.g., avionics applications) executing thereon. The GOS 118 and user applications 120 may be partitioned into one or more virtual machines 122 (VM) via which the user applications may access shared system resources 112, 114 (e.g., via a common access bus 124 interconnecting the MCPE 100 with all SSR required by its hosted applications). Shared system resources 112, 114 may include, but are not limited to, system memory (e.g., double data rate (DDR) synchronous dynamic random access memory (SDRAM), flash memory, non-volatile memory, or types of read-only memory (ROM)); shared caches (e.g., L1, L2, and L3 caches, translation lookaside buffer caches, or platform input/output caches); peripheral devices (e.g., display devices, key panel devices, or communication devices); and controllers (e.g., I/O controllers, direct memory access controllers, or programmable interrupt controllers). One or more processing cores 102-108 may contend for the same SSR 112, for example, resulting in delays while a first core waits to access an SSR already in use by a second core.

The shared memory regions may include regions (116) accessible to the hypervisor 110 and core-specific shared memory regions 116*a-d* accessible to the GOS 118 running on each processing core 102-108. Each processing core 102-108 may have its own dedicated shared memory region 116*a-d* to prevent corruption of a core's data by a GOS 118 on another core while enabling data sharing between each GOS and the hypervisor 110.

The PLASMA architecture is based on interaction between the hypervisor 110, the GOS 118 running on each processing core 102-108, and a processing application 126 running on any processing core (106) within the MCPE 100.

The processing application 126 may read and correlate performance data from both classes of shared memory regions 116, 116a-d, determining precise SSR access data from each processing core 102-108 and each user application 120 executing thereon. The resulting SSR access data may be sent to a data capture application 128 remotely located from the MCPE 100. For example, the data capture application 128 may run on a processor or other computing device 130 remote from the MCPE 100 but linked thereto via a network 132 accessible to the MCPE via a network stack 134 running on a processing core 108 of the MCPE.

The hypervisor 110 may initialize performance monitor registers (PMR) within the MCPE 100 for tracking preselected features or events corresponding to SSR access by user applications 116 on each processing core 102-108. The PMRs may be sampled on a core-specific basis (or per another device) by the hypervisor 110 (at a base rate of the system, e.g., every 1 ms) and the resulting PMR data stored to the hypervisor-accessible shared memory region 116 (e.g., as timestamped PMR data written to core-specific shared memory queues).

Whenever an SSR 112, 114 is accessed by a user application 120, necessitating a VM swap between the prior VM 122 associated with the prior accessing user application and the current VM associated with the current, or newly accessing, user application, the GOS 118 corresponding to the current user application (or the hypervisor 110) may write a timestamped VM identifier (ID) to its core-specific shared memory region (116a-d; e.g., to a core-specific VM data queue (202, FIG. 2)). For example, the VM data may note the specific processing core (102-108) and the particular VM 122 accessing the SSR 112-114 as well as a start time corresponding to the SSR access. The VM data may be recorded at any level of scheduling, e.g., thread or process, as appropriate.

The processing application 126 may read and correlate both sets of shared memory data, e.g., the queued PMR data written to the hypervisor-accessible shared memory region 116 by the hypervisor 110 and the queued VM data written to each core-specific shared memory region 116a-d by the GOS 118 running on each individual processing core 102-108 (or by the hypervisor 110). By correlating the PMR and VM timestamped data, the processing application 126 may accurately determine an execution time corresponding to each individual VM 122, e.g., the time window between the VM start time (or when the VM first accesses an SSR 112-114 on behalf of a particular user application 120 on a particular processing core 102-108) and a second VM start time corresponding to an access of the SSR by a different VM on behalf of a different user application. Similarly, the processing application 126 may determine, for each VM execution time, a count of changes (e.g., deltas) to each core-specific PMR during the execution time (which PMR changes, for example, may also correspond to specific SSR accesses by specific user applications 120 on specific processing cores 102-108). The resulting VM execution times and PMR deltas may be sent out (e.g., to the data capture application 128) via the network stack 134.

Figure 2:
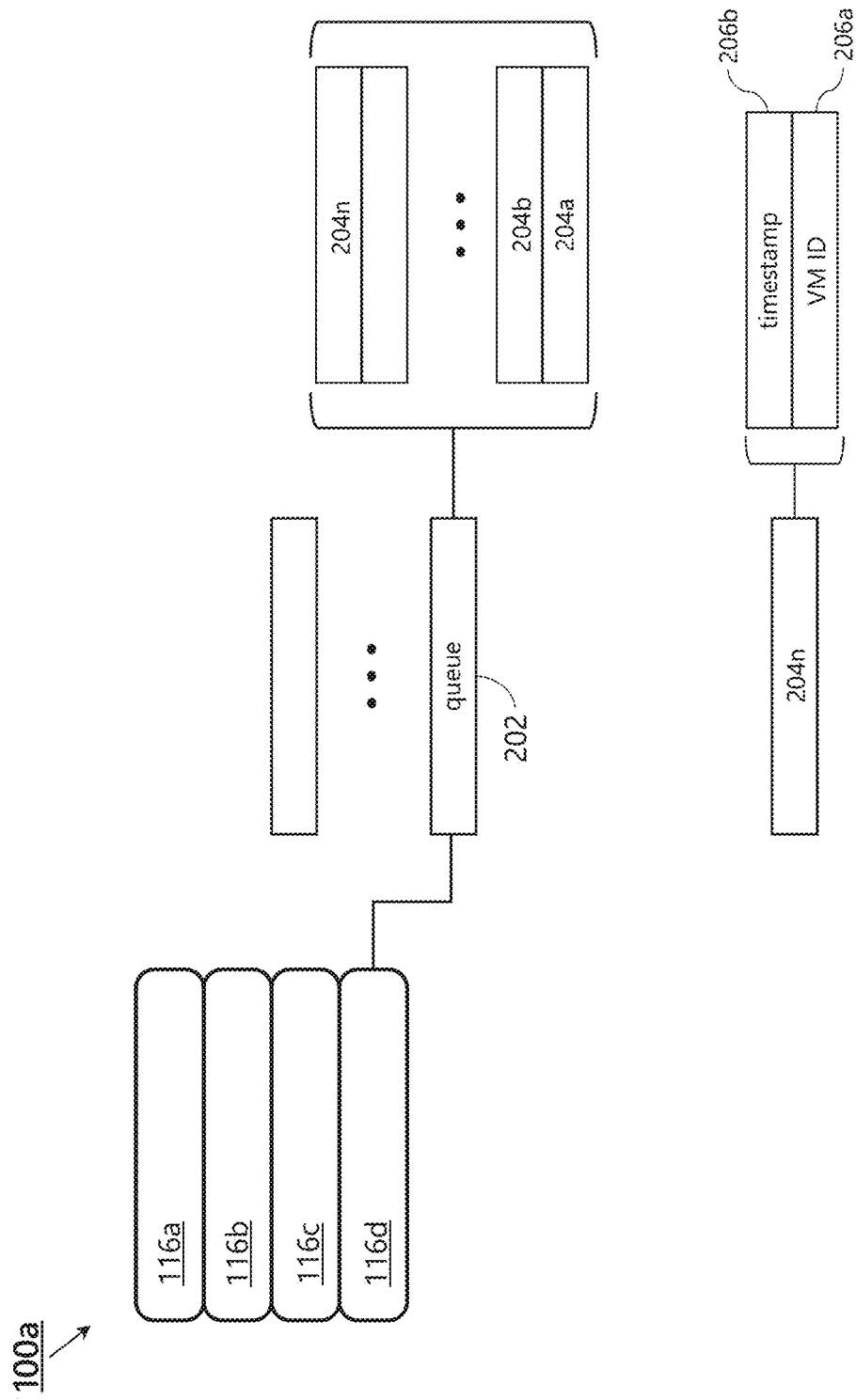
FIG. 2 is a diagrammatic illustration of a shared memory region of the MCPE of FIG. 1.

Referring now to FIG. 2, the MCPE 100a may be implemented and may function similarly to the MCPE 100 of FIG. 1, except that the core-specific shared memory regions 116a-d of the MCPE 100a may each be accessible to the GOS (118, FIG. 1) running on its corresponding processing core (102-108, FIG. 1). The GOS 118, or the hypervisor (110, FIG. 1), may write the timestamped VM ID to the associated core-specific shared memory region (VM data queue 202).

For example, each core-specific shared memory region 116a-d may incorporate a VM data queue 202. The VM data queue 202 may incorporate a predetermined number (e.g., 50) of individual VM data entries 204a . . . 204n (e.g., timestamped VM identifiers). Each individual VM data entry 204n may include a VM identifier 206a corresponding to a particular VM (122, FIG. 1) as well as the corresponding swap time 206b (e.g., the start time when the VM accessed a particular SSR (112-114, FIG. 1)). Information written to the VM data queues 202 in the core-specific shared memory regions 116a-d may be accessible by the processing application (126, FIG. 1).

Figure 3A:
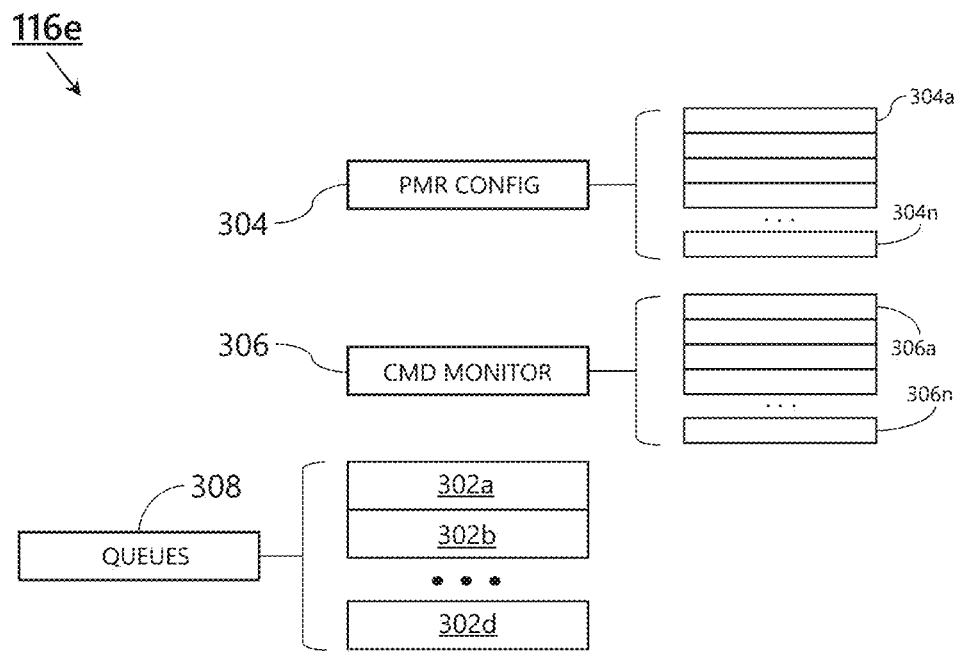
FIGS. 3A and 3B are diagrammatic illustrations of a shared memory region of the MCPE of FIG. 1.

Referring now to FIG. 3A, the hypervisor-accessible shared memory region 116e may be implemented and may function similarly to the shared memory region 116 of FIG. 1, except that the shared memory region 116e may store the PMR data queues 302a-d corresponding to each processing core (102-108, FIG. 1).

The shared memory region 116e may also store a PMR configuration 304 corresponding to the current programmed state of the PMR. For example, the PMR configuration 304 may include a table of component features 304a . . . 304n (e.g., 6 individual features) tracked by the processing application (126, FIG. 1) and defined by the command monitor 306. For example, each component feature 304a-n monitored by the PMR configuration 304 may track a particular event (e.g., parameter) corresponding to an access of a particular SSR (112-114, FIG. 1) by a particular VM (122, FIG. 1) on behalf a particular user application (120, FIG. 1) executing on a particular processing core 102-108. Event types may include, but are not limited to, a number of data accesses, a number of cache misses, or a number of interrupts. The processing application 126 may receive command input to change the PMR configuration 304, and may do so by adjusting the definitions 306a . . . 306n in the command monitor 306.

Figure 3B:
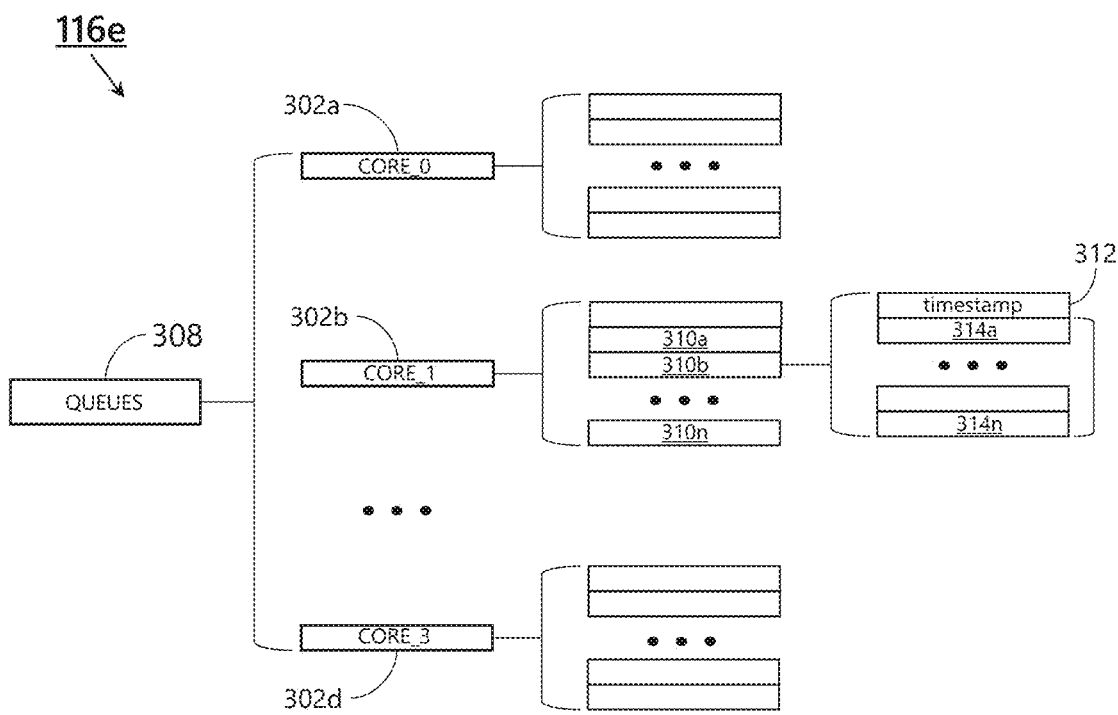

Referring also to FIG. 3B, the shared memory region 116e may include a queues region 308 specifying the core-specific PMR data queues 302a-d of PMR data entries 310a . . . 310n, to which the hypervisor 110 may write sampled PMR information (e.g., PMR timestamps). For example, at each predetermined time interval (e.g., 1 ms), the hypervisor 110 may sample the PMRs and write to each PMR data queue 302a-d a PMR data entry 310b including the sampling time (312) and current values 314a . . . 314n for each component feature 304a . . . 304n monitored by the PMR configuration 304 (e.g., during the current time window).

Referring to FIG. 4, the processing application 126a may be implemented and may function similarly to the processing application 126 of FIG. 1, except that the processing application 126a may read and correlate the activation data (402) written to the VM data queues (202, FIG. 2) in the core-specific shared memory regions (116a-d; FIG. 2) and the PMR data queues (302a-d, FIGS. 3A/B) in the hypervisor-accessible shared memory region (116e, FIGS. 2A/B).

For example, when the processing application (126, FIG. 1) launches, the application may read the queues stored to shared memory (e.g., the VM data queues 202 and the PMR data queues 302a-d) to determine a "zero time" suitable as a starting point for activation of data processing. The processing application 126a may then sleep for a single cycle and compare the resulting "tick" value (i.e., timer increment, $t_{(1)}$) with the immediately prior zero time $t_{(0)}$.

The processing application 126a may then match the VM swap time (e.g., VM start time) to the correctly corresponding PMR data. As the VM swap time written by the GOS (118, FIG. 1) runs on the same control thread as the PMR data written by the hypervisor 110, the VM data queues 202 may be slightly larger than their corresponding PMR data queues 302a-d. A "tick tolerance" value may be computed by the processing application 126a to avoid associating the VM swap time with the wrong PMR data. The processing application 126a may empty all queues (202, 302a-d) to ensure that one and only one datagram is produced per cycle and sleep for one cycle while data is collected. After copying all shared memory regions 116, 116a-d (FIG. 1), the processing application 126a may check for commands, reconfiguring the PMR configuration 304 by adjusting the event definitions 306a-n (FIG. 3A) in the command monitor 306 (FIG. 3A) and purging all queues (202, 302a-d) if directed to do so. The processing application 126a may capture the current settings 304a-n or state of the PMR configuration 304 so that the capture application (128, FIG. 1) may track each PMR configuration change as well as which access events or features are monitored.

The processing application 126a may then determine PMR changes for each processing core (102-108, FIG. 1) or relevant system device. For example, the activation data 402 may include activation data sets 404a . . . 404n. The precise number of activation data sets 404a . . . 404n may vary depending upon the number of VM swaps during a given cycle. Each activation data set 404a . . . 404n may include a core identifier 406 (identifying the corresponding processing core 102-108) and VM identifier 208a of the accessing VM (122, FIG. 1; if a given processing core 102-108 has no VM executing thereon a VM ID of zero may be used), a message type 408, a VM execution time 410, and a set (412) of PMR deltas 412a . . . 412n indicating changes to each PMR 304a . . . 304n during the VM execution time. (The first cycle may not be used as it is not likely to correspond to a full time period.)

For example, the VM execution time may be determined by comparing, within adjacent VM timestamps (204a-b, FIG. 2) the VM swap time (206b, FIG. 2) of the VM timestamp 204a corresponding to a starting VM (122, FIG. 1) and the VM swap time of the VM timestamp 204b corresponding to the preceding VM. If multiple VMs 122 are running on a processing core 102-108, the correct VM execution time 410 may be determined by scanning the PMR data queues 302a-d for the timestamp (312, FIG. 3B) most closely matching the corresponding VM timestamp (208b, FIG. 2) (e.g., within the tick tolerance) and counting the elapsed ticks. If no VM swap occurs, an arbitrary VM execution time 410 (e.g., 10 ticks) may be used. Each PMR delta 412a-n may be determined by taking the difference of each end PMR value 312a-n and its corresponding start PMR value, e.g., from successive PMR data entries 310a, 310b. After calculating the PMR deltas 412a-n, the processing application may take the end time of the VM execution time 410 as the start time of the next cycle or time interval.

As the PMR deltas 412a-n track changes in each monitored event or parameter (308a-n, FIG. 3A) specific to a particular VM 122 and processing core 102-108, the activation data 402 may provide an accurate footprint of the SSR (112-114, FIG. 1) needed by each user application (120, FIG. 1).

Figure 5A:
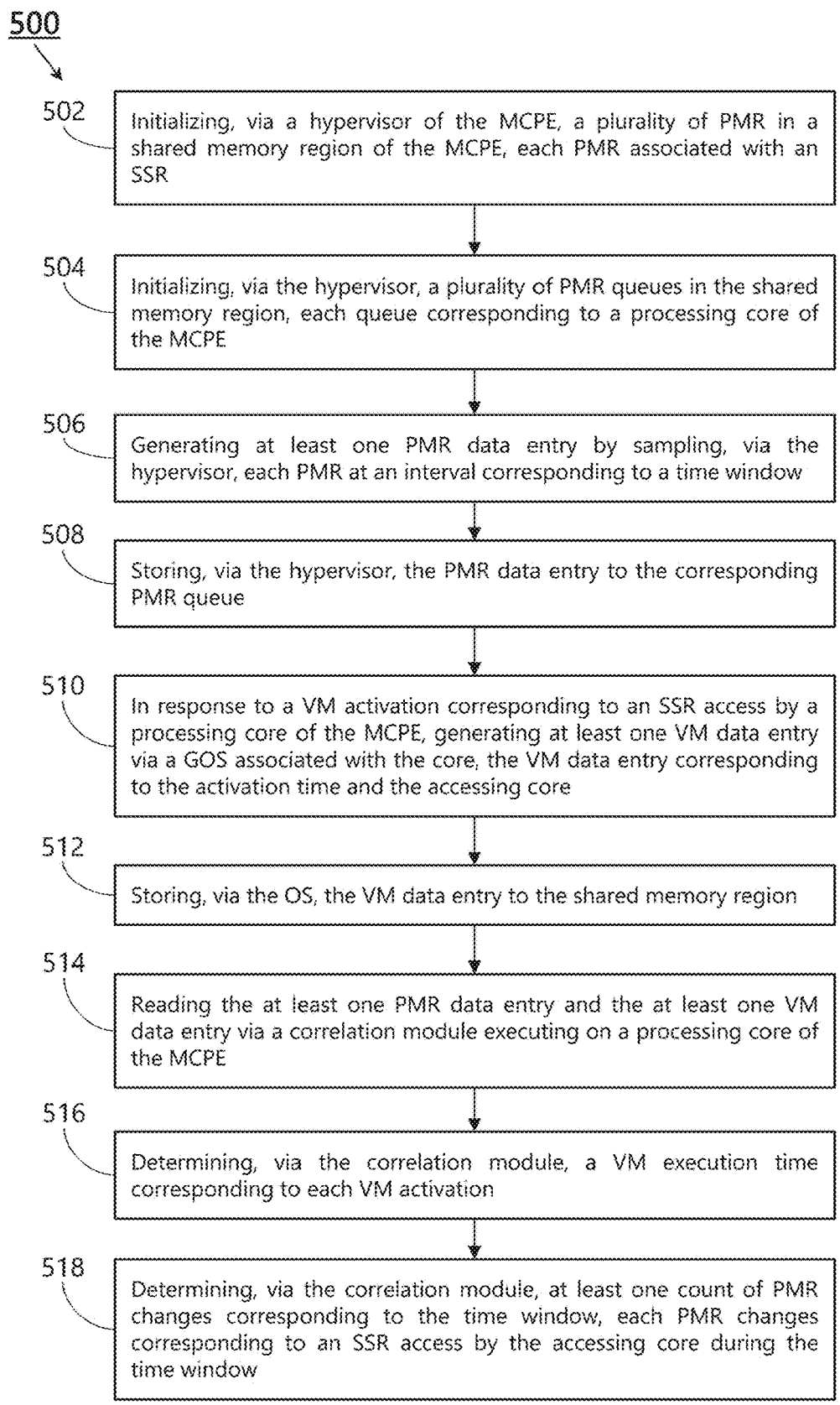

Referring now to FIG. 5A, an exemplary embodiment of a method 500 for quantifying shared system resource usage according to the inventive concepts disclosed herein may be implemented by the MCPE 100 in some embodiments, and may include one or more of the following steps.

At a step 502, the hypervisor initializes performance monitor registers (PMR) within the MCPE, the PMR configuration corresponding to a set of features or access events to be monitored.

At a step 504, the hypervisor initializes the PMR data queues in the hypervisor-accessible shared memory region, each PMR data queue dedicated to a processing core of the MCPE and its hosted applications.

At a step 506, the hypervisor generates PMR data queue entries (e.g., PMR timestamps) by sampling the PMRs for each processing core at a predetermined interval corresponding to a time window (e.g., 1 ms).

At a step 508, the hypervisor stores the PMR data entries to their respective core-specific PMR data queue.

At a step 510, in response to a virtual machine (VM) activation (the VM activation corresponding to an access by a user application running on a processing core) of a shared system resource (SSR), the guest operating system (GOS) or hypervisor running on the core generates VM data entries (e.g., VM timestamps) identifying the accessing core, the activated VM, and the time of the VM activation.

At a step 512, the GOS (or hypervisor) stores the VM data to a VM data queue in shared memory specific to the accessing core.

At a step 514, a processing application running on a core of the MCPE reads the PMR data and the VM data.

At a step 516, the processing application determines a VM execution time for each VM activation by correlating the current VM's timestamp and the preceding VM's timestamp.

At a step 518, the processing application determines, for each VM execution time, a count of PMR deltas during the time window, the PMR deltas corresponding to shared resource accesses by the associated user application on the corresponding core via the executing VM.

The method 500 may additionally include a step 520. Referring now to FIG. 5B, at the step 520, the processing application forwards the determined VM execution times and corresponding counts of PMR deltas to a data capture application located remotely from the MCPE for further processing.

As will be appreciated from the above, systems and methods according to embodiments of the inventive concepts disclosed herein may avoid MCPE rate limiting based on overly conservative WCET predictions by precisely footprinting the exact amount of shared system resources and execution time required by each user application running in the MCPE. This improves SWAPc considerations by allowing the MCPE to integrate more applications without the risk of unforeseen latency issues.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objectives and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

We claim:

1. A multi-core processing environment (MCPE), comprising:
a plurality of processing cores, each processing core associated with at least one of:
an application configured to execute on the processing core and to access at least one shared system resource (SSR) via a virtual machine (VM);
a core-specific memory region accessible by the processing core;
a guest operating system (GOS) configured to write queued VM data to the core-specific memory region, the queued VM data corresponding to a start time of the VM;
a plurality of shared memory regions including:
the plurality of core-specific memory regions;
and
a hypervisor-accessible memory region configured to store:
a plurality of performance monitor registers (PMR);
at least one state of the PMR, the state corresponding to at least one feature monitored by the PMR and the processing core;
and
a queue of one or more PMR data entries for each processing core, each PMR data entry associated with a plurality of values, each value corresponding to the monitored feature;
a hypervisor configured to:
write the queued VM data to the corresponding core-specific memory region;
sample the one or more PMR data entries from the plurality of PMR at an interval corresponding to a time window;
and
write the one or more PMR data entries to the corresponding queue;
and
at least one correlation module configured to execute on a first processing core of the plurality of processing cores, the correlation module configured to:
read the queued VM data and the queued PMR data entries;
and
determine, by correlating the queued VM data and the queued PMR data entries, at least one of:
an execution time of the VM;
and
for each execution time, a count of PMR changes corresponding to the monitored feature and to the time window, each PMR change corresponding to an SSR access by the associated processing core.

2. The MCPE of claim 1, wherein the SSR access is associated with at least one event.

3. The MCPE of claim 2, wherein the event includes at least one of a data access, an interrupt, and a cache miss.

4. The MCPE of claim 1, wherein the monitored feature is a first monitored feature, and the correlation module is configured to adjust the PMR state by changing the at least one monitored feature to a second monitored feature.

5. The MCPE of claim 1, wherein the plurality of SSR includes at least one of a system memory, shared cache, a shared peripheral device, and a shared controller.

6. The MCPE of claim 1, wherein the count of PMR changes corresponds to a number of accesses of the SSR during the time window.

7. The MCPE of claim 1, further comprising:
at least one capture module located remotely from the plurality of processing cores and communicatively coupled to the correlation module via a network, the capture module configured to receive the at least one VM execution time and the at least one count of PMR changes.

8. The MCPE of claim 1, wherein the plurality of processing cores includes at least one of a virtual core, a thread, and a logical execution unit.

9. The MCPE of claim 1, wherein:
the corresponding core-specific memory region includes a core-specific data queue;
the queued VM data includes a timestamped VM identifier corresponding to the start time;
and
each PMR data entry is associated with a PMR timestamp.

10. A multi-core processing environment (MCPE), comprising:
1) a plurality of shared system resources (SSR);
2) a plurality of processing cores, each processing core associated with at least one of:
a) an application configured to execute on the processing core and to access the at least one SSR via a virtual machine (VM);
and
b) a guest operating system (GOS) configured to write queued VM data to a core-specific memory region accessible by the processing core, the queued VM data corresponding to a start time of the VM;
3) at least one common access bus configured for interconnecting the plurality of processing cores and the plurality of SSR;
4) a plurality of shared memory regions including:
the plurality of core-specific memory regions;
and
a hypervisor-accessible memory region configured to store:
a plurality of performance monitor registers (PMR);
at least one state of the PMR, the state corresponding to at least one feature monitored by the PMR and the processing core;
and
a queue of one or more PMR data entries for each processing core, each PMR data entry associated with a plurality of values, each value corresponding to the monitored feature;
5) a hypervisor configured to:
write the queued VM data to the corresponding core-specific memory region;
sample the queued PMR data entries from the plurality of PMR at an interval corresponding to a time window;
and
write each PMR data entry to the corresponding queue;
and
6) at least one correlation module configured to execute on a first processing core of the plurality of processing cores, the correlation module configured to:
read the queued VM data and the queued PMR data entries;
and determine, by correlating the queued VM data and the queued PMR data entries, at least one of:
- an execution time of the VM; and
- for each execution time, a count of PMR changes corresponding to the monitored feature and to the time window, each PMR change corresponding to an access of the SSR by the associated processing core.

11. The MCPE of claim 10, wherein the plurality of SSR includes at least one of a system memory, shared cache, a shared peripheral device, and a shared controller.

12. The MCPE of claim 10, further comprising:
at least one capture module located remotely from the plurality of processing cores and communicatively coupled to the correlation module via a network, the capture module configured to receive the at least one determined VM execution time and the at least one determined count of PMR changes.

13. The MCPE of claim 10, wherein the count of PMR changes corresponds to a number of accesses of the SSR during the time window.

14. The MCPE of claim 10, wherein each access of the SSR is associated with at least one event.

15. The MCPE of claim 14, wherein the event includes at least one of a data access, an interrupt, and a cache miss.

16. The MCPE of claim 10, wherein the monitored feature is a first monitored feature, and the correlation module is configured to adjust the PMR state by changing the monitored feature to a second monitored feature.

17. The MCPE of claim 10, wherein the plurality of processing cores includes at least one of a virtual core, a thread, and a logical execution unit.

18. The MCPE of claim 10, wherein:
the VM data includes a timestamped VM identifier corresponding to the start time; and
each PMR data entry is associated with a PMR timestamp.

19. A method for quantifying shared system resource (SSR) usage in a multi-core processing environment (MCPE), comprising:
initializing, via a hypervisor of the MCPE, a plurality of performance monitor registers (PMR) in a shared memory region of the MCPE;
initializing, via the hypervisor, a plurality of PMR queues in the shared memory region, each queue corresponding to a processing core of the MCPE;
generating at least one PMR data entry by sampling, via the hypervisor, each PMR at an interval corresponding to a time window;
storing, via the hypervisor, the PMR data entry to the corresponding PMR queue;
in response to a virtual machine (VM) activation corresponding to an SSR access by a processing core of the MCPE, generating at least one VM data entry via an operating system (OS) associated with the accessing processing core, the at least one VM data entry corresponding to a time of the VM activation and to the accessing processing core;
storing, via the OS, the at least one VM data entry to the shared memory region;
reading the at least one PMR data entry and the at least one VM data entry via a correlation module executing on ay processing core of the MCPE;
determining, via the correlation module, a VM execution time corresponding to each VM activation;
determining, via the correlation module, at least one count of PMR changes corresponding to the time window, each PMR change corresponding to an SSR access by the accessing processing core during the time window.

20. The MCPE of claim 19, further comprising:
forwarding at least one of the determined VM execution time and the determined count of PMR changes to a capture module located remotely from the MCPE.

* * * * *